US010356275B2

(12) United States Patent
Yokoyama

(10) Patent No.: US 10,356,275 B2
(45) Date of Patent: Jul. 16, 2019

(54) WIRELESS COMMUNICATION APPARATUS FOR DETERMINING WIRELESS COMMUNICATION TO BE USED, WIRELESS COMMUNICATION TERMINAL FOR DETERMINING WIRELESS COMMUNICATION TO BE USED, AND COMPUTER-READABLE AND NON-TRANSITORY RECORDING MEDIUM STORING PROGRAM FOR SELECTING WIRELESS COMMUNICATION TO BE USED

(71) Applicant: SEIKO EPSON CORPORATION, Tokyo (JP)

(72) Inventor: Daiki Yokoyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/113,131

(22) Filed: Aug. 27, 2018

(65) Prior Publication Data

US 2018/0367697 A1    Dec. 20, 2018

Related U.S. Application Data

(63) Continuation of application No. 15/596,093, filed on May 16, 2017, now Pat. No. 10,091,389.

(30) Foreign Application Priority Data

Jul. 19, 2016    (JP) ................................ 2016-141061

(51) Int. Cl.
*G06F 15/00*    (2006.01)
*G06F 3/12*    (2006.01)
(Continued)

(52) U.S. Cl.
CPC ........... *H04N 1/33384* (2013.01); *H04B 1/00* (2013.01); *H04N 1/00103* (2013.01);
(Continued)

(58) Field of Classification Search
CPC ........... H04N 1/33384; H04N 1/00103; H04N 1/00315; H04N 1/00893; H04W 4/80; H04W 36/14; H04W 36/24; H04B 1/00
USPC ............................... 358/1.13, 1.15, 1.14, 1.1
See application file for complete search history.

(56) References Cited

U.S. PATENT DOCUMENTS

2009/0052348 A1    2/2009 Kato et al.
2010/0137023 A1    6/2010 Chishima et al.
(Continued)

FOREIGN PATENT DOCUMENTS

JP    2004-036414 A    2/2004
JP    2009-135865 A    6/2009

*Primary Examiner* — Douglas Q Tran

(57) ABSTRACT

A wireless communication apparatus includes a first wireless communication unit that performs a first wireless communication, a second wireless communication unit that performs a second wireless communication that consumes less electric power than the first wireless communication, a power supply circuit that supplies electric power to the first and second wireless communication unit by receiving electric power supply from a battery or an external power supply, a state detection unit that detects whether the power supply circuit is in a first state for receiving the electric power supply from the external power supply or in a second state for receiving the electric power supply from the battery, and a first control unit. The first control unit determines which one of the first and second wireless communications to adopt as a wireless communication that is to be used for communication, based on detection result by the state detection unit.

12 Claims, 7 Drawing Sheets

(51) Int. Cl.
*G06K 1/00* (2006.01)
*H04N 1/333* (2006.01)
*H04W 4/80* (2018.01)
*H04N 1/00* (2006.01)
*H04W 36/14* (2009.01)
*H04W 52/02* (2009.01)
*H04B 1/00* (2006.01)
*H04W 36/24* (2009.01)
*H04W 88/06* (2009.01)

(52) U.S. Cl.
CPC ..... *H04N 1/00315* (2013.01); *H04N 1/00893* (2013.01); *H04W 4/80* (2018.02); *H04W 36/14* (2013.01); *H04W 36/24* (2013.01); *H04W 52/0261* (2013.01); H04N 2201/006 (2013.01); H04N 2201/0055 (2013.01); H04N 2201/0094 (2013.01); H04N 2201/33342 (2013.01); H04W 88/06 (2013.01); Y02D 70/00 (2018.01); Y02D 70/10 (2018.01); Y02D 70/14 (2018.01); Y02D 70/142 (2018.01); Y02D 70/144 (2018.01); Y02D 70/166 (2018.01)

(56) References Cited

U.S. PATENT DOCUMENTS

| | | |
|---|---|---|
| 2011/0261389 A1 | 10/2011 | Ohara |
| 2015/0035655 A1* | 2/2015 | Lu ................ G06K 19/0701 340/10.51 |
| 2017/0078835 A1* | 3/2017 | Ochi ................ H04W 60/04 |

* cited by examiner

WIRELESS COMMUNICATION APPARATUS FOR DETERMINING WIRELESS COMMUNICATION TO BE USED, WIRELESS COMMUNICATION TERMINAL FOR DETERMINING WIRELESS COMMUNICATION TO BE USED, AND COMPUTER-READABLE AND NON-TRANSITORY RECORDING MEDIUM STORING PROGRAM FOR SELECTING WIRELESS COMMUNICATION TO BE USED

CROSS-REFERENCE TO RELATED APPLICATIONS

This application is a continuation application of U.S. patent application Ser. No. 15/596,093 filed on May 16, 2017. This application claims priority to Japanese Patent Application No. 2016-141061 filed on Jul. 19, 2016. The entire disclosures of U.S. patent application Ser. No. 15/596,093 and Japanese Patent Application No. 2016-141061 are hereby incorporated herein by reference.

BACKGROUND

1. Technical Field

The present invention relates to a wireless communication apparatus, a wireless communication terminal, and a program.

2. Related Art

There exists a known communication system that includes a first wireless communication unit (e.g., a Bluetooth (registered trademark) communication unit) and a second wireless communication unit (e.g., a Near Field Communication (NFC) communication unit) and that first performs communication that uses the second wireless communication unit and then performs a handover from the communication that uses the second wireless communication unit to communication that uses the first wireless communication unit (e.g., see JP-A-2004-364145 and JP-A-2009-135865).

However, in JP-A-2004-364145 and JP-A-2009-135865 mentioned above, the handover from the communication by the second wireless communication unit (e.g., communication by NFC or Bluetooth Low Energy (BLE)) to the communication by the first wireless communication unit (e.g., communication by Bluetooth (registered trademark) or Wi-Fi) increases electric power consumption, so that there is a problem of inconvenience occurring depending on battery state (e.g., failure in completing communication due to battery exhaustion during the communication).

SUMMARY

An advantage of some aspects of the invention is that a wireless communication apparatus that operates on electric power supplied from a battery and that is capable of determining an optimal handover destination on the basis of the state of the battery, and the like, are provided.

An aspect of the invention provides a wireless communication apparatus that includes a first wireless communication unit that performs a first wireless communication, a second wireless communication unit that performs a second wireless communication that consumes less electric power than the first wireless communication, a power supply circuit that supplies electric power to the first wireless communication unit and the second wireless communication unit by receiving electric power supply from a battery or an external power supply, a state detection unit that detects whether the power supply circuit is in a first state for receiving the electric power supply from the external power supply or in a second state for receiving the electric power supply from the battery, and a first control unit that controls the first wireless communication unit and the second wireless communication unit. The first control unit determines which one of the first wireless communication and the second wireless communication to adopt as a wireless communication that is to be used for communication, based on detection result by the state detection unit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
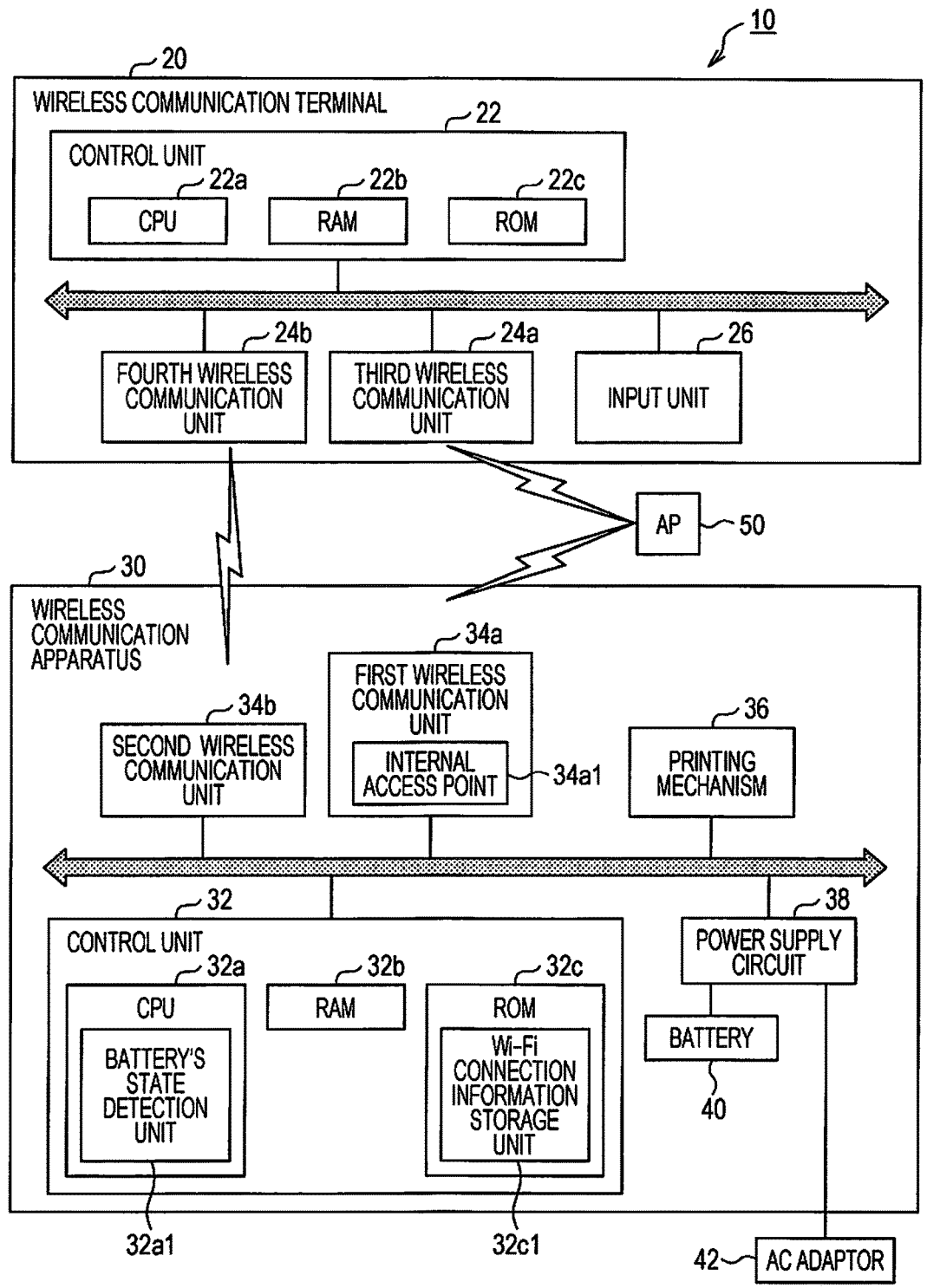
FIG. 1 is a diagram illustrating an example of a system configuration of a wireless communication system to which the wireless communication apparatus, the wireless communication method, the wireless communication terminal, and the program of the invention are applied.

Exemplary embodiments of the invention will be described hereinafter with reference to the accompanying drawings. Like component elements are referenced by the same reference characters in the drawings and are not redundantly described below.

FIG. 1 is a diagram illustrating an example of a system configuration of a wireless communication system 10 to which the wireless communication apparatus, the wireless communication method, the wireless communication terminal, and the program of the invention are applied.

As illustrated in FIG. 1, the wireless communication system 10 of this exemplary embodiment includes a wireless communication apparatus 30, a wireless communication terminal 20, and a relay apparatus 50.

The wireless communication apparatus 30 is typically a printer but is not limited so, that is, may also be an apparatus other than a mere printer. For example, the wireless communication apparatus 30 may be a scanner, a copier, a facsimile machine, or a multifunction printer (MFP) that includes at least two of the aforementioned functions. The wireless communication apparatus 30, with an alternating current (AC) adapter 42 connected, operates on electric power supplied through the AC adapter 42 and, with the AC adapter 42 not connected, operates on electric power supplied form the battery 40.

The wireless communication apparatus 30 includes, as a hardware configuration, mainly a control unit 32, a first wireless communication unit 34a, a second wireless communication unit 34b, a printing mechanism 36, a power supply circuit 38, a battery 40, etc.

The control unit 32 (first control unit) includes a CPU 32a, a RAM 32b, a ROM 32c, etc.

The RAM 32b is used as a working region when the CPU 32a performs various computation processes. The ROM 32c is, for example, a rewritable non-volatile memory, such as a flash ROM, in which firmware, such as control programs, is stored. Furthermore, the ROM 32c includes a Wi-Fi connection information storage unit 32c1. Wi-Fi connection information stored in the Wi-Fi connection information storage unit 32c1 is connection information for connection to an access point by Wi-Fi communication which includes service set identifiers (SSIDs) and passwords to use at the time of connecting to an access point and also includes an IP address of the wireless communication apparatus 30 that serves as a destination address when print data is sent to the wireless communication apparatus 30 by Wi-Fi communication. The access points are, for example, a relay apparatus 50 (external access point) and an internal access point 34a1.

The first wireless communication unit 34a performs a first wireless communication. The first wireless communication is, for example, a wireless communication that uses Wi-Fi (hereinafter, referred to as "Wi-Fi communication"). The first wireless communication unit 34a is made up of, for example, a wireless local area network (LAN) chip (e.g., a controller) and a wireless LAN module.

The first wireless communication unit 34a includes the internal access point 34a1 to which a third wireless communication unit 24a of the wireless communication terminal 20 can directly connect. The internal access point 34a1 may be, for example, an internal access point described in JP-A-2016-86384.

The second wireless communication unit 34b performs a second wireless communication that consumes less electric power than the first wireless communication. The second wireless communication is, for example, a wireless communication according to Bluetooth Low Energy (BLE) (hereinafter, referred to as "BLE communication"). The second wireless communication unit 34b is made up of, for example, a BLE chip (e.g., a controller) and a BLE module.

The printing mechanism 36 includes, although not depicted, a print head, a sheet feeding mechanism, etc.

The power supply circuit 38 supplies an operation voltage to component elements of the wireless communication apparatus 30 that include the first wireless communication unit 34a and the second wireless communication unit 34b. Specifically, the power supply circuit 38 supplies electric power supplied from the AC adapter 42 or the battery 40 to the component elements of the wireless communication unit 30. For example, when both the AC adapter 42 and the battery 40 are connected, the power supply circuit 38 supplies electric power supplied from the AC adapter 42 to the component elements of the wireless communication unit 30 (AC powering). On another hand, when the AC adapter 42 is not connected but only the battery 40 is connected, the power supply circuit 38 supplies electric power supplied from the battery 40 to the component elements of the wireless communication unit 30 (battery powering). The power supply circuit 38 also performs the charging of the battery 40.

The battery 40 is, for example, a secondary battery such as a rechargeable lithium-ion battery.

As for a functional configuration, the wireless communication apparatus 30 has a function of controlling the first wireless communication unit 34a and the second wireless communication unit 34b, a function of detecting a state of the battery 40 (i.e., a battery's state detection unit 32a1), a function of determining which one of Wi-Fi communication and BLE communication to adopt as a wireless communication that is to be used for communication on the basis of the state of the battery 40 detected by the battery's state detection unit 32a1, etc.

These functions are realized by one or more processor that is a CPU or a hardware circuit as ASIC (Application Specific Integrated Circuit), or by cooperating these processor. For example, these functions are realized by the CPU 32a of the wireless communication apparatus 30 executing control programs stored in the ROM 32c.

The battery's state detection unit 32a1 detects as a state of the battery 40, for example, whether the wireless communication unit 30 is being powered by the battery 40 (i.e., whether the wireless communication unit 30 is being battery-powered or AC-powered). The battery's state detection unit 32a1 also detects as a state of the battery 40, for example, whether the remaining amount of electric power stored in the battery 40 is greater than or equal to a predetermined threshold value or smaller than a predetermined threshold value.

The wireless communication terminal 20 is typically, but not limited to, a smart phone and may also be other than a smart phone, for example, a personal computer (PC), a tablet type terminal, a cellular phone, etc.

The wireless communication terminal 20 includes, as hardware components, mainly a control unit 22, the third wireless communication unit 24a, a fourth wireless communication unit 24b, an input unit 26, etc.

The control unit 22 (a second control unit) includes a CPU 22a, a RAM 22b, a ROM 22c, etc.

The RAM 22b is used as a working region when the CPU 22a performs various computation processes. The ROM 22c is, for example, a rewritable non-volatile memory, such as a flash ROM, and stores an operating system (hereinafter, referred to as OS) and application programs that are executed on the OS.

The third wireless communication unit 24a performs the first wireless communication. The third wireless communication unit 24a is made up of, for example, a wireless LAN chip (e.g., a controller) and a wireless LAN module.

The fourth wireless communication unit 24b performs the second wireless communication that consumes less electric power than the first wireless communication. The fourth wireless communication unit 24b is made up of, for example, a BLE chip (e.g., a controller) and a BLE module.

The input unit 26 is made up of a touch screen display (a display equipped with a touch panel). The touch screen display serves as both an input unit and a display unit.

As for a functional configuration, the wireless communication terminal 20 has a function of controlling the third wireless communication unit 24a and the fourth wireless communication unit 24b, a function of generating print data, a function of sending the generated print data to the wireless communication apparatus 30, etc.

These functions are realized by the CPU 22a of the wireless communication terminal 20 executing application programs stored in the ROM 22c.

The relay apparatus 50 (an external access point) is, for example, a router. The relay apparatus 50 may be, for example, a relay apparatus described in JP-A-2016-86384.

Next, an example of an operation of the wireless communication system 10 of this exemplary embodiment will be described with reference to FIG. 2.

Figure 2:
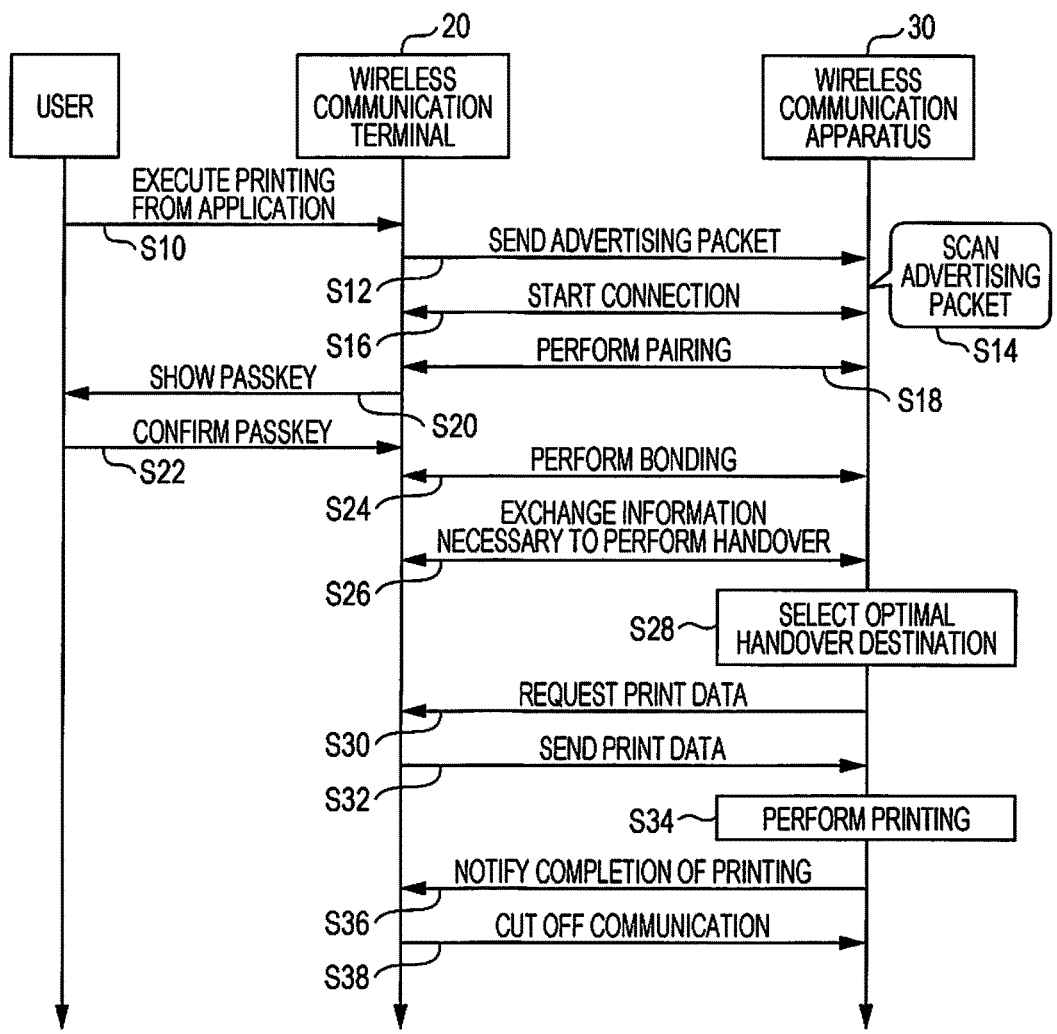
FIG. 2 is a sequence chart for using BLE communication for printing.

FIG. 2 is a sequence chart for using BLE communication for printing.

First, a user activates an application program in the wireless communication terminal 20 and executes printing from the application program (step S10).

When printing is executed from the application program, the wireless communication terminal 20 becomes peripheral (slave) and sends a connectable advertising packet (step S12).

Next, the wireless communication apparatus 30 scan the connectable advertising packet (step S14) and starts to connect to the wireless communication terminal 20 (step S16).

Next, in order to establish connection between the wireless communication terminal 20 and the wireless communication apparatus 30, pairing is performed (step S18). At that time, the wireless communication terminal 20 shows the user a passkey (step S20) and the user confirms the passkey (step S22).

Next, in order to perform generation and exchange of a permanent security cryptographic key, bonding is performed (step S24).

Through steps S10 to S24 described above, connection between the wireless communication terminal 20 and the wireless communication apparatus 30 is established. Specifically, the wireless communication terminal 20 and the wireless communication apparatus 30 enter a state of being capable of BLE communication.

Next, information necessary to perform handover is exchanged (step S26). For example, the wireless communication terminal 20 sends a planned number of prints to the wireless communication apparatus 30 via the fourth wireless communication unit 24b. The wireless communication apparatus 30 receives the planned number of prints from the wireless communication terminal 20 via the second wireless communication unit 34b and stores the planned number of prints into the RAM 32b or the like.

Next, the wireless communication apparatus 30 executes a handover destination determining process (see FIG. 4) described later, on the basis of the information exchanged in step S26 (step S28). Although the handover destination determining process will be described below, it is assumed that the handover destination determining process has determined BLE communication as an optimal handover destination.

Next, the wireless communication apparatus 30, using BLE communication, requests print data from the wireless communication terminal 20 (step S30). Concretely, the wireless communication apparatus 30 requests print data from the wireless communication terminal 20 via the second wireless communication unit 34b, which performs BLE communication (step S30).

Next, the wireless communication terminal 20, after receiving the request for print data, sends print data to the wireless communication apparatus 30 via the fourth wireless communication unit 24b, which performs BLE communication (step S32).

Next, the wireless communication apparatus 30 receives the print data via the second wireless communication unit 34b, which performs BLE communication, and, on the basis of the received print data, controls the print mechanism 36 to execute printing (step S34).

Next, when the printing is completed, the wireless communication apparatus 30 notifies the wireless communication terminal 20 that the printing is completed via the second wireless communication unit 34b, which performs BLE communication (step S36).

Next, after receiving the notification of the completion of printing, the wireless communication terminal 20 cuts off the BLE connection (step S38).

After that, the wireless communication apparatus 30 waits until the wireless communication apparatus 30 receives again an advertising packet sent from the wireless communication terminal 20.

Then, when the wireless communication apparatus 30 receives an advertising packet, the process of step S16 to S38 described above is executed.

Next, another example of operation of the wireless communication system 10 of this exemplary embodiment will be described with reference to FIG. 3.

Figure 3:
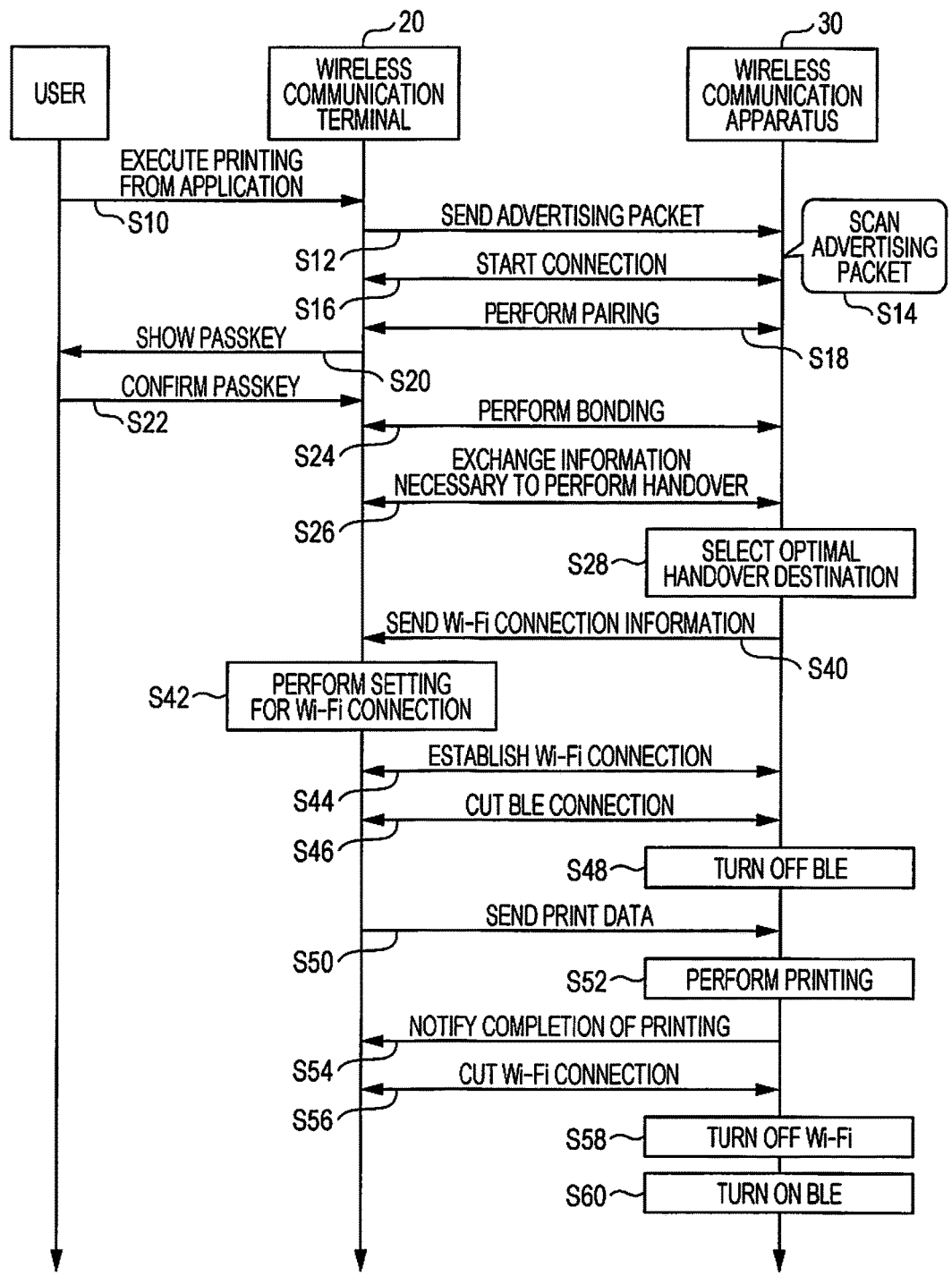
FIG. 3 is a sequence chart for using Wi-Fi for printing.

FIG. 3 is a sequence chart when Wi-Fi communication is used for printing.

Hereinafter, substantially the same steps as in FIG. 2 will be referenced by the same characters.

Firstly, a user activates an application program in the wireless communication terminal 20 and executes printing from the application program (step S10).

When printing is executed from the application program, the wireless communication terminal 20 becomes peripheral (slave) and sends a connectable advertising packet (step S12).

Next, wireless communication apparatus 30, as central (master), scans the connectable advertising packet (step S14) and starts connecting to the wireless communication terminal 20 (step S16).

Next, in order to establish connection between the wireless communication terminal 20 and the wireless communication apparatus 30, pairing is performed (step S18). At that time, the wireless communication terminal 20 shows a passkey to the user (step S20). The user confirms the passkey (step S22).

Next, in order to generate and exchange a permanent security cryptographic key, bonding is performed (step S24).

Through steps S10 to S24 described above, connection between the wireless communication terminal 20 and the wireless communication apparatus 30 is established. Specifically, a state in which BLE communication is possible between the wireless communication terminal 20 and the wireless communication apparatus 30 is brought about.

Next, information necessary to perform handover is exchanged (step S26). For example, the wireless communication terminal 20 sends a planned number of prints to the wireless communication apparatus 30 via the fourth wireless communication unit 24b. The wireless communication apparatus 30 receives the planned number of prints from the wireless communication terminal 20 via the second wireless communication unit 34b and stores the planned number of prints into the RAM 32b.

Next, on the basis of the information exchanged in step S26, the wireless communication apparatus 30 executes a handover destination determining process (see FIG. 4) described below (step S28). Although the handover destination determining process will be described in detail below, it is assumed here that, as a result of the handover destination determining process, Wi-Fi communication is determined as an optimal handover destination.

Next, the wireless communication apparatus 30 performs delivery of Wi-Fi connection information by using BLE communication (step S40). Concretely, the wireless communication apparatus 30 (the second wireless communication unit 34b) sends connection information for connecting to the relay apparatus 50 (or connection information for connecting to the internal access point 34a1) as Wi-Fi connection information to the wireless communication terminal 20 that is the communication partner (hereinafter, sometimes referred to as "partner wireless communication terminal 20") by BLE communication.

Next, after receiving the Wi-Fi connection information, the wireless communication terminal 20, on the basis of the Wi-Fi connection information, performs Wi-Fi connection setting (step S42) to switch a connection unit from the fourth wireless communication unit 24b to the third wireless communication unit 24a. Likewise, the wireless communication apparatus 30 also switches a connection unit from the second wireless communication unit 34b to the first wireless communication unit 34a. This establishes connection by Wi-Fi (step S44). Specifically, a state in which Wi-Fi communication is possible between the wireless communication terminal 20 and the wireless communication apparatus 30 is brought about.

Next, after detecting that the connection unit has been switched, the wireless communication apparatus 30 cuts off BLE communication with the wireless communication terminal 20 (step S46) and turns off BLE (step S48). Concretely, the wireless communication apparatus 30 stops the supply of electric power to the second wireless communication unit 34b, which performs BLE communication.

Next, the wireless communication terminal 20 sends print data to the wireless communication apparatus 30 via the third wireless communication unit 24a, which performs Wi-Fi communication (step S50).

Next, the wireless communication apparatus 30 receives the print data from the wireless communication terminal 20 via the first wireless communication unit 34a, which performs Wi-Fi communication. On the basis of the received print data, the wireless communication apparatus 30 controls the printing mechanism 36 to execute printing (step S52).

Next, after the printing is completed, the wireless communication apparatus 30 notifies the completion of the printing to the wireless communication terminal 20 via the first wireless communication unit 34a, which performs Wi-Fi communication (step S54).

Next, after receiving the notification of the completion of the printing, the wireless communication terminal 20 cuts off Wi-Fi connection (step S56).

Next, the wireless communication apparatus 30 (power supply circuit 38) turns off Wi-Fi (step S58). Concretely, the wireless communication apparatus 30 (power supply circuit 38) stops the supply of electric power to the first wireless communication unit 34a, which performs Wi-Fi communication.

Next, the wireless communication apparatus 30 (power supply circuit 38) turns on BLE (step S60). Concretely, the wireless communication apparatus 30 (power supply circuit 38) start supplying electric power to the second wireless communication unit 34b, which performs BLE communication.

Thus, after the partner wireless communication terminal 20 sends print data by Wi-Fi communication (or after the printing based on the print data is completed), the supply of electric power to the first wireless communication unit 34a is stopped and the supply of electric power to the second wireless communication unit 34b is started.

By stopping the supply of electric power to the first wireless communication unit 34a in this manner, electric power saving is realized.

Note that when it is detected by the battery's state detection unit 32a1 that the state of the battery 40 is not battery powering, the supply of electric power to the first wireless communication unit 34a may be stopped and the supply of electric power to the second wireless communication unit 34b may be started following the elapse of a predetermined time after the partner wireless communication terminal 20 has sent print data by Wi-Fi communication (or after the printing based on the print data is completed). Furthermore, when it is detected by the battery's state detection unit 32a1 that the state of the battery 40 is battery powering, the electric power supply of the first wireless communication unit 34a may be stopped and the supply of electric power to the second wireless communication unit 34b may be started prior to the elapse of a predetermined time after the partner wireless communication terminal 20 sends print data by Wi-Fi communication (or after the printing based on the print data is completed).

In this manner, when it is detected that the wireless communication apparatus 30 is not being battery powered, the next print data that is sent from the partner wireless communication terminal 20 prior to the elapse of the predetermined time can be expeditiously received by the first wireless communication unit 34a. The expeditious reception is realized because when it is detected that the wireless communication apparatus 30 is not being battery powered, the handover from Wi-Fi communication to BLE communication is not performed before the predetermined time elapses.

After that, the wireless communication apparatus 30 waits until the wireless communication apparatus 30 receives again an advertising packet sent from the wireless communication terminal 20.

Then, when the wireless communication apparatus 30 receives an advertising packet, the process of the steps described above will be executed.

Incidentally, it is also permissible that when the battery's state detection unit 32a1 detects as state of the battery 40 that the wireless communication apparatus 30 is not being battery powered, the wireless communication apparatus 30 (the second wireless communication unit 34b) notifies the partner wireless communication terminal 20 of a wireless connection that uses the relay apparatus 50 (external access point) (wireless communication via the relay apparatus 50). Furthermore, it is desirable that when the battery's state detection unit 32a1 detects as a state of the battery 40 that the wireless communication apparatus 30 is battery powered, the wireless communication apparatus 30 notifies the partner wireless communication terminal 20 of wireless communication that uses the internal access point 34a1 (wireless communication via the internal access point 34a1).

In this manner, when it is detected that the wireless communication apparatus 30 is being battery powered, Wi-Fi communication can be performed via the internal access point 34a1. This achieves the following advantages.

That is, when it is detected that the wireless communication apparatus 30 is being battery powered, there is possibility that the user may be using the wireless communication apparatus 30 at a location away from home and connection setting may not be made for an external access point at that location away from home. Therefore, when it is detected that the wireless communication apparatus 30 is being battery powered, a wireless connection by an internal access point, instead of a wireless connection by an external access point, is notified. This causes the partner wireless communication terminal 20 to automatically establish a wireless connection by an internal access point, achieving an advantage of improved ease of handling.

Next, an example of a handover destination determining process will be described with reference to FIG. 4.

Figure 4:
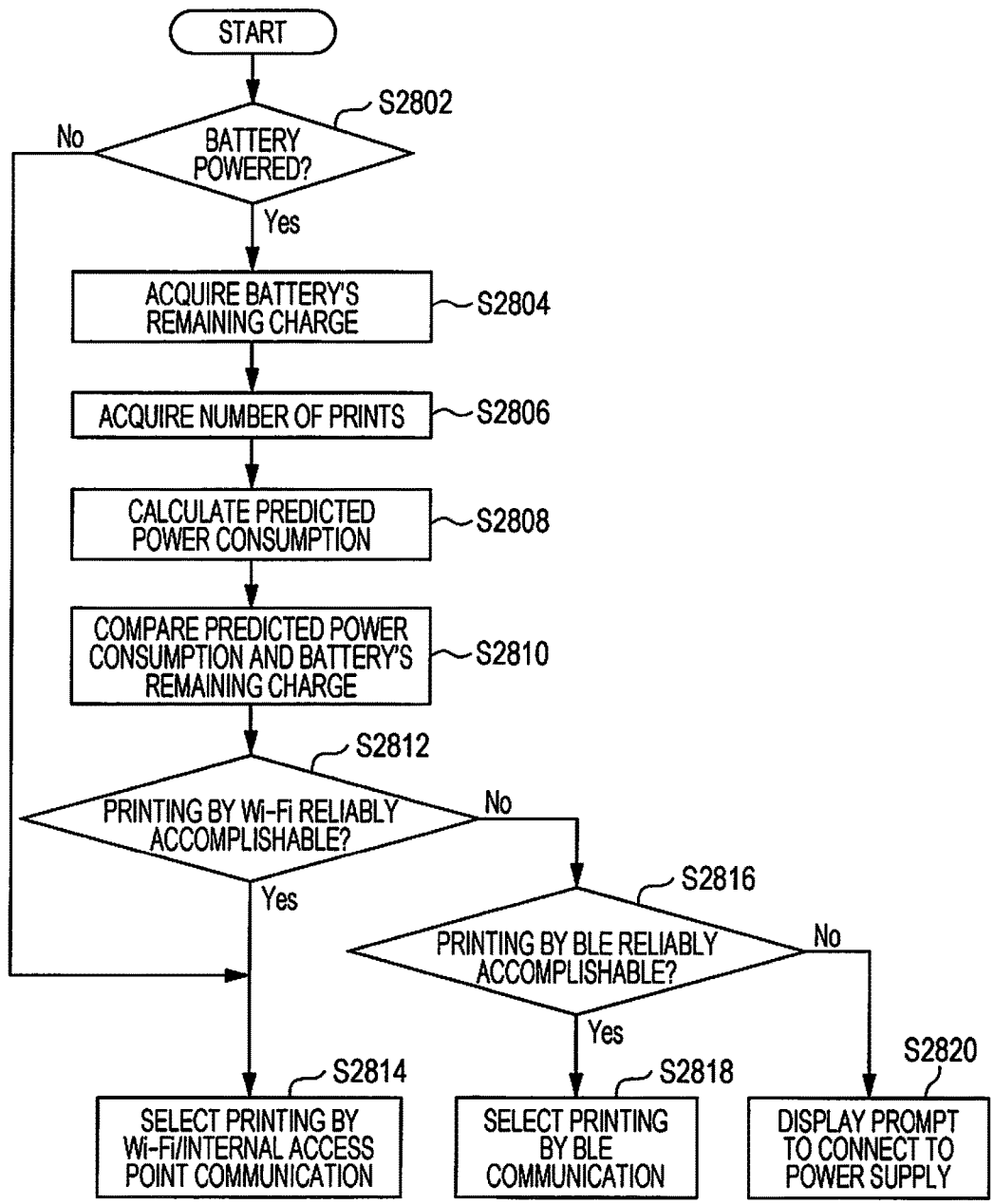
FIG. 4 is a flowchart for describing an example of a handover destination determining process.

FIG. 4 is a flowchart for describing an example of the handover destination determining process.

In a handover destination determining process illustrated in FIG. 4, the wireless communication apparatus 30 (control unit 32) determines which one of Wi-Fi communication and BLE communication to adopt as a wireless communication that is to be used for communication (i.e., is an optimal handover destination) on the basis of the state of the battery 40. The handover destination determining process illustrated in FIG. 4 is executed in step S28 in FIGS. 2 and 3.

First, the wireless communication apparatus 30 (battery's state detection unit 32a1) detects as a state of the battery 40 whether the wireless communication apparatus 30 is being powered by battery, more concretely, whether the wireless communication apparatus 30 is being battery powered or AC powered. This corresponds to a battery's state detecting step in the invention. A method used to detect whether the wireless communication apparatus 30 is being battery powered or AC powered may be, for example, a method described in JP-A-2015-187019.

Next, when it is detected as a state of the battery 40 that the wireless communication apparatus 30 is not being battery powered (i.e., is being AC powered) (NO in step S2802), the wireless communication apparatus 30 (control unit 32) determines adoption of Wi-Fi communication (communication by Wi-Fi/internal access point) as a wireless communication to be used for communication (step S2814).

On the other hand, when it is detected as a state of the battery 40 that the wireless communication apparatus 30 is being battery powered (YES in step S2802), the wireless communication apparatus 30 (battery's state detection unit 32a1) acquires (detects) the battery's remaining charge (the remaining amount of electric power charged in the battery 40) as a state of the battery 40 (step S2804). This corresponds to a battery's state detecting step in the invention. A method used to detect the battery's remaining charge may be, for example, a method described in JP-A-2012-108032.

Next, the wireless communication apparatus 30 acquires the number of prints (planned number of prints) from the wireless communication terminal 20 via the fourth wireless communication unit 24b (step S2806). Note that when the number of prints has already been acquired in step S26 and stored in the RAM 32b, the number of prints is acquired from the RAM 32b. In this case, step S2806 is omitted.

Next, the wireless communication apparatus 30 calculates a predicted electric power consumption from Expression 1 and Expression 2 (step S2808).

Predicted electric power consumption during Wi-Fi printing($W$)=number of prints×electric power consumption at the time of Wi-Fi printing($W$)     (Expression 1)

Predicted electric power consumption during BLE printing($W$)=number of prints×electric power consumption at the time of BLE printing($W$) (electric power consumed to print a sheet of standard printing)     (Expression 2)

The number of prints here refers to the number of prints (planned number of prints) acquired in step S2806. The electric power consumption (W) at the time of Wi-Fi printing and the electric power consumption (W) at the time of BLE printing each refer to the electric power consumed to print a sheet of standard printing and are measured and stored in the ROM 32c of the wireless communication apparatus 30 beforehand.

Next, the wireless communication apparatus 30 compares the predicted electric power consumption calculated in step S2808 and battery's remaining charge acquired in step S2804 (step S2810).

Next, the wireless communication apparatus 30 determines whether the printing can be reliably accomplished by Wi-Fi on the basis of a result of comparison in step S2810 (step S2812).

Concretely, when, as a result of the comparison in step S2810, the battery's remaining charge acquired in step S2804 is greater than the predicted electric power consumption (W) during Wi-Fi printing determined by Expression 1 mentioned above, the wireless communication apparatus 30 determines that the printing can be reliably accomplished by Wi-Fi (YES in step S2812). In this case, the wireless communication apparatus 30 determines adoption of Wi-Fi communication (Wi-Fi/internal access point by communication) as a wireless communication to be used for communication (i.e., as an optimal handover destination) (step S2814). This corresponds to a wireless communication determining step in the invention.

On the other hand, when, as a result of comparison in step S2810, the battery's remaining charge acquired in step S2804 is smaller than the predicted electric power consumption (W) during Wi-Fi printing determined by Expression 1 mentioned above, the wireless communication apparatus 30 does not determine that the printing can be reliably accomplished by Wi-Fi (NO in step S2812). In this case, the wireless communication apparatus 30 determines whether the printing can be reliably accomplished by BLE on the basis of a result of comparison in step S2810 (step S2816).

Concretely, when, as a result of comparison in step S2810, the battery's remaining charge acquired in step S2804 is greater than the predicted electric power consumption (W) during BLE printing determined by Expression 2, the wireless communication apparatus 30 determines that the printing can be reliably accomplished by BLE (YES in step S2816). In this case, the wireless communication apparatus 30 determines adoption of BLE communication as a wireless communication to be used for communication (i.e., as an optimal handover destination) (step S2818). This corresponds to a wireless communication determining step in the invention.

On the other hand, when, result of comparison in step S2810, the battery's remaining charge acquired in step S2804 is smaller than the predicted electric power consumption (W) during BLE printing determined by Expression 2, the wireless communication apparatus 30 does not determine that the printing can be reliably accomplished by BLE (NO in step S2816). In this case, the wireless communication apparatus 30 informs the wireless communication terminal 20 via the second wireless communication unit 34b that a guidance that prompts the user to connect the wireless communication apparatus 30 to an electric power supply (e.g., the AC adapter 42) should be displayed (step S2820). The thus-informed wireless communication terminal 20 displays in its touch screen display a guidance that prompts the user to connect the wireless communication apparatus 30 to an electric power supply.

In this manner, the wireless communication apparatus 30 determines which one of Wi-Fi communication and BLE communication to adopt as the wireless communication that is to be used for communication (i.e., is an optimal handover destination) on the basis of the state of the battery 40.

As described above, according to this exemplary embodiment, the wireless communication apparatus 30 that operates on electric power supplied from the battery 40 and that is capable of determining an optimal handover destination on the basis of the state of the battery 40 can be provided.

This is because the control unit 32 determines which one of Wi-Fi communication and BLE communication to adopt as the wireless communication that is to be used for communication on the basis of the state of the battery 40 detected by the battery's state detection unit 32a1.

Next, modifications will be described.

Although the exemplary embodiment has been described in conjunction with an example of the handover destination determining process with reference to FIG. 4, the handover destination determining process is not limited to the foregoing process.

Figure 5:
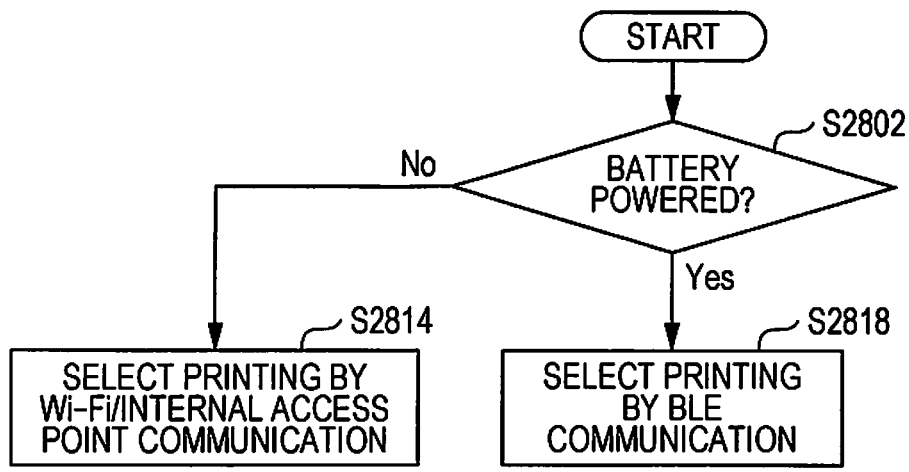
FIG. 5 is a flowchart for describing a first modification of the handover destination determining process.

FIG. 5 is a flowchart for describing a first modification of the handover destination determining process.

For example, as illustrated in FIG. 5, the following operation is possible. When the battery's state detection unit 32a1 detects as a state of the battery 40 that the wireless communication apparatus 30 is not being battery powered (NO in step S2802), the wireless communication apparatus 30 determines adoption of Wi-Fi communication (Wi-Fi/internal access point by communication) as the wireless communication to be used for communication (step S2814). On the other hand, when the battery's state detection unit 32a1 detects as a state of the battery 40 that the wireless communication apparatus 30 is being battery powered (YES in step S2802), the wireless communication apparatus 30 determines adoption of BLE communication as the wireless communication to be used for communication (step S2818).

This modification can achieve substantially the same advantageous effects as the foregoing exemplary embodiment.

Figure 6:
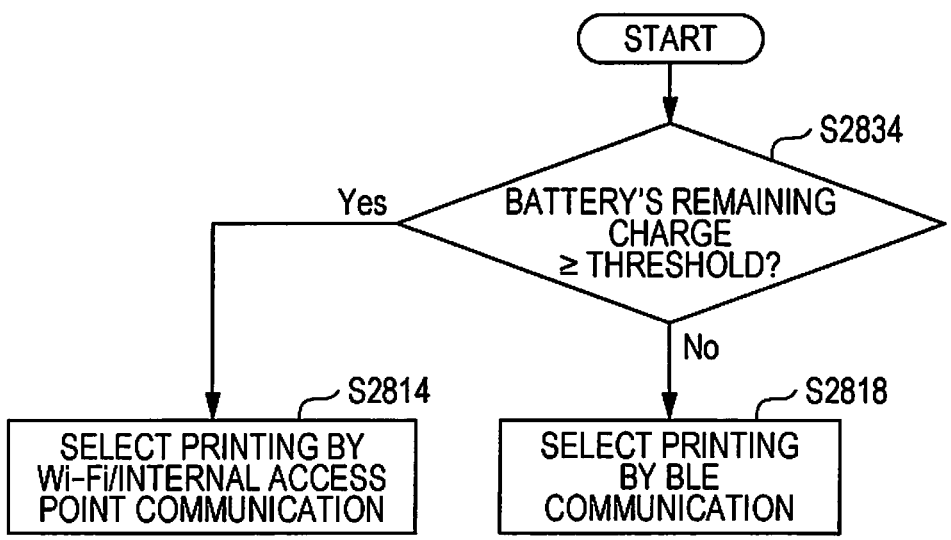
FIG. 6 is a flowchart for describing a second modification of the handover destination determining process.

FIG. 6 is a flowchart for describing a second modification of the handover destination determining process.

For example, as illustrated in FIG. 6, the following operation is also possible. When the battery's state detection unit 32a1 detects as a state of the battery 40 that the remaining amount of electric power accumulated in the battery 40 is greater than or equal to a predetermined threshold value (YES in step S2834), the wireless communication apparatus 30 determines adoption of Wi-Fi communication (Wi-Fi/internal access point by communication) as the wireless communication to be used for communication (step S2814). On the other hand, when the battery's state detection unit 32a1 detects as a state of the battery 40 that the remaining amount of electric power accumulated in the battery 40 is less than the predetermined threshold value (NO in step S2834), the wireless communication apparatus 30 determines adoption of BLE communication as the wireless communication to be used for communication (step S2818).

Next, a third modification of the handover destination determining process will be described with reference to FIG. 7.

Figure 7:
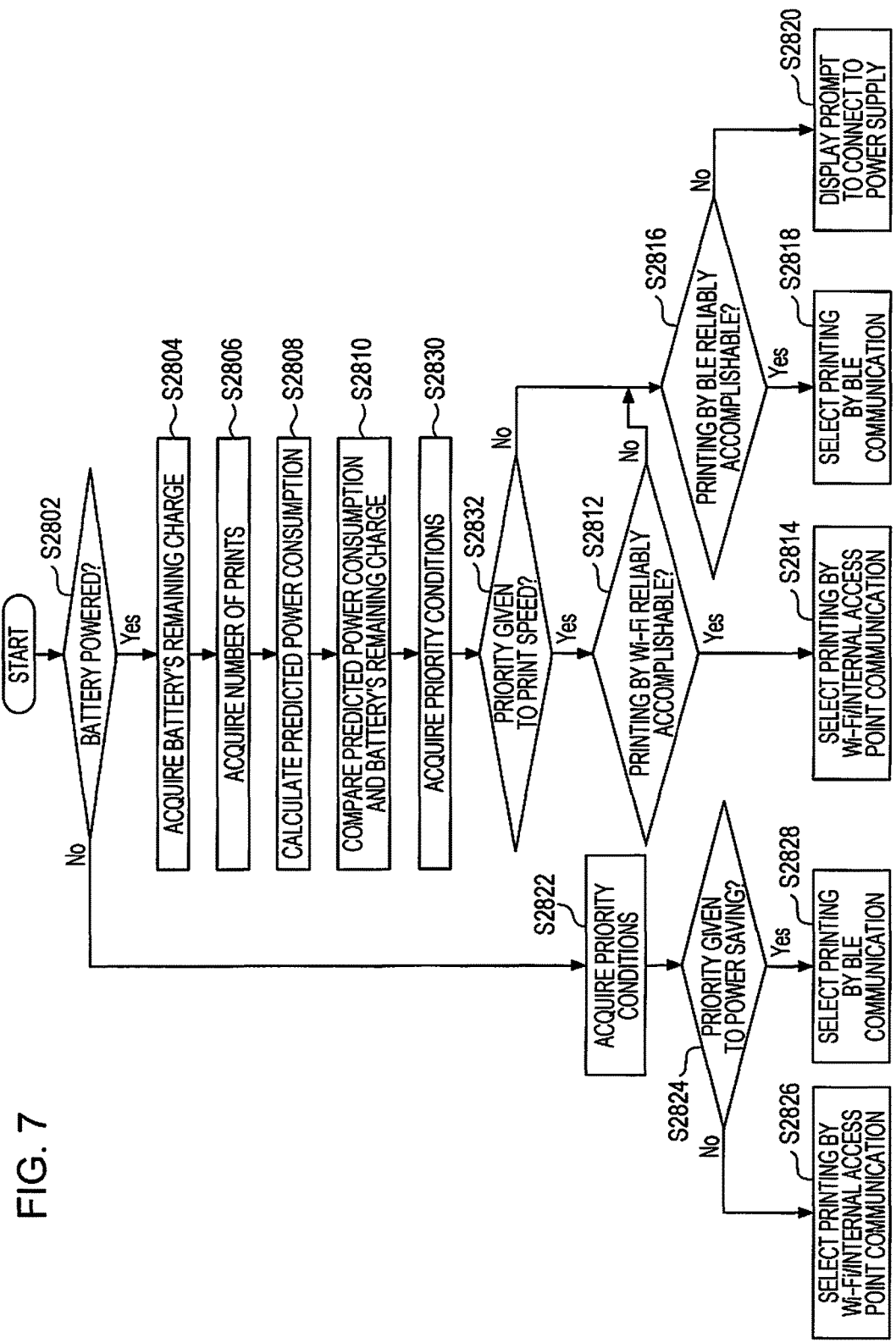
FIG. 7 is a flowchart for describing a third modification of the handover destination determining process.

FIG. 7 is a flowchart for describing a third modification of the handover destination determining process.

The flowchart illustrated in FIG. 7 corresponds to a flowchart obtained by adding steps S2822 to S2832 to the flowchart illustrated in FIG. 4.

In the handover destination determining process illustrated in FIG. 7, the wireless communication apparatus 30 (control unit 32) determines which one of Wi-Fi communication and BLE communication to adopt as the wireless communication that is to be used for communication (i.e., is an optimal handover destination) on the basis of the state of the battery 40 and a priority condition. The handover destination determining process illustrated in FIG. 7 is executed in step S28 in FIG. 2 and FIG. 3.

The following description will be made centrally on differences from the flowchart illustrated in FIG. 4. The same steps as in FIG. 4 are referenced by the same reference characters and redundant descriptions will be omitted as appropriate.

First, the wireless communication apparatus 30 (battery's state detection unit 32a1) detects as a state of the battery 40 whether the wireless communication apparatus 30 is being battery powered, more concretely, whether the wireless communication apparatus 30 is being battery powered or AC powered.

Next, when it is detected as a state of the battery 40 that the wireless communication apparatus 30 is not being battery powered (i.e., is being AC power) (NO in step S2802), the wireless communication apparatus 30 (control unit 32) acquires the priority condition (step S2822). For example, the control unit 32 reads the priority condition out of the ROM 32c of the wireless communication apparatus 30. The priority condition includes such a setting as to give priority to electric power saving or such a setting as to give priority to print speed and is stored beforehand in the ROM 32c by a user.

Next, the wireless communication apparatus 30 determines whether priority is to be given to electric power saving on the basis of the acquired priority condition (step S2824).

Next, when it is determined that priority is not given to electric power saving (NO in step S2824), for example, when it is determined that priority is given to print speed, the wireless communication apparatus 30 determines adoption of Wi-Fi communication (Wi-Fi/internal access point by communication) as the wireless communication to be used for communication (step S2826). On the other hand, when it is determined that priority is given to electric power saving (YES in step S2824), the wireless communication apparatus 30 determines adoption of BLE communication as the wireless communication to be used for communication (i.e., as an optimal handover destination).

When it is detected as a state of the battery 40 that the wireless communication apparatus 30 is being battery powered (YES in step S2802), the wireless communication apparatus 30 (control unit 32) acquires (detects) the battery's remaining charge (the remaining amount of electric power accumulated in the battery 40) as a state of the battery 40 (step S2804).

Next, the wireless communication apparatus 30 acquires the number of prints (planned number of prints) from the wireless communication terminal 20 via the fourth wireless communication unit 24b (step S2806).

Next, the wireless communication apparatus 30 calculates a predicted electric power consumption by using Expression 1 and Expression 2 mentioned above (step S2808).

Next, the wireless communication apparatus 30 compares the predicted electric power consumption calculated in step S2808 and the battery's remaining charge acquired in step S2804 (step S2810).

Next, as in step S2822, the wireless communication apparatus 30 acquires the priority condition (step S2830).

Next, on the basis of the acquired priority condition, the wireless communication apparatus 30 determines whether priority is given to print speed (step S2832).

Next, when it is determined that priority is given to print speed (YES in step S2832), the wireless communication apparatus 30 determines whether the printing can be reliably accomplished by Wi-Fi (step S2812).

When it is determined that the printing can be reliably accomplished by Wi-Fi (YES in step S2812), the wireless communication apparatus 30 determines adoption of Wi-Fi communication (Wi-Fi/internal access point by communication) as the wireless communication to be used for communication (i.e., as an optimal handover destination) (step S2814).

On the other hand, when it is not determined that printing can be reliably accomplished by Wi-Fi (NO in step S2812), the wireless communication apparatus 30 further determines whether the printing can be reliably accomplished by BLE (step S2816). Then, when it is determined that the printing can be reliably accomplished by BLE (YES in step S2816), the wireless communication apparatus 30 determines adoption of BLE communication as the wireless communication to be used for communication (i.e., as an optimal handover destination) (step S2818).

On the other hand, when it is not determined that the printing can be reliably accomplished by BLE (NO in step S2816), the wireless communication apparatus 30 informs the wireless communication terminal 20 via the second wireless communication unit 34b that a guidance that prompts the user to connect the wireless communication apparatus 30 to an electric power supply (e.g., the AC adapter 42) should be displayed (step S2820). The thus-informed wireless communication terminal 20 displays in its touch screen display a guidance that prompts the user to connect the wireless communication apparatus 30 to an electric power supply.

Note that when it has been determined that priority is not given to print speed (NO in step S2832), the wireless communication apparatus 30 executes the process of step S2816, for example, even when it has been determined that priority is given to electric power saving.

In the foregoing manner, the wireless communication apparatus 30 determines which one of Wi-Fi communication and BLE communication to adopt as the wireless communication that is to be used for communication (i.e., is an optimal handover destination) on the basis of the state of the battery 40 and the priority condition.

These modifications can also achieve substantially the same advantageous effects as the foregoing exemplary embodiment.

Furthermore, although in the exemplary embodiment and modifications, the wireless communication apparatus 30 executes the handover destination determining process as an example, this configuration does not limit the invention. For example, the wireless communication terminal 20 may execute the handover destination determining process.

Figure 8:
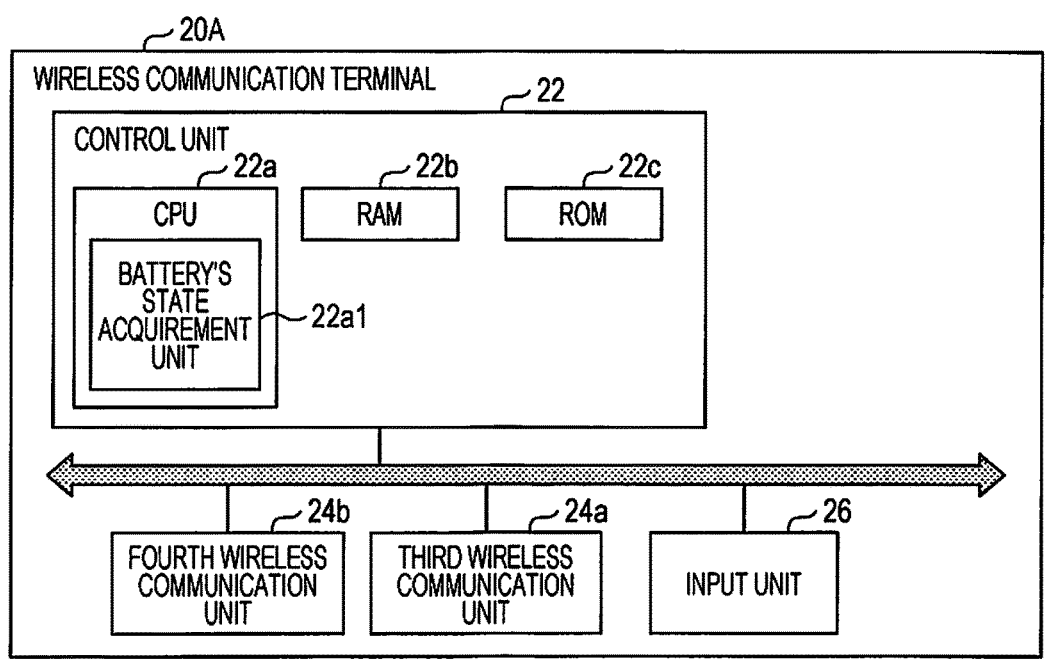
FIG. 8 illustrates an example of a system configuration of a wireless communication terminal that executes the handover destination determining process.

FIG. 8 shows an example of a system configuration of a wireless communication terminal 20A that executes the handover destination determining process.

As illustrated in FIG. 8, the wireless communication terminal 20A that executes the handover destination determining process includes a third wireless communication unit 24a that performs Wi-Fi communication, a fourth wireless communication unit 24b that performs BLE communication, a battery's state acquisition unit 22a1 that acquires a state of the battery 40 of a wireless communication apparatus 30, and a control unit 22 (second control unit) that controls the third wireless communication unit 24a and the fourth wireless communication unit 24b.

The control unit 22 determines which one of BLE communication and Wi-Fi communication to adopt as the wireless communication that is to be used for communication, on the basis of the state of the battery 40 of the wireless communication apparatus 30 acquired by the battery's state acquisition unit 22a1.

The battery's state acquisition unit 22a1 acquires the state of the battery 40 of the wireless communication apparatus 30 from the wireless communication apparatus 30, for example, in step S32 in FIG. 2 and FIG. 3.

Then, the wireless communication terminal 20A informs the wireless communication apparatus 30 of the handover destination determined as described above at a timing between step S28 and step S30 in FIG. 2 (or between step S28 and step S40 in FIG. 3).

This modification can achieve substantially the same advantageous effects as the foregoing exemplary embodiment and the foregoing modifications.

Furthermore, although in the exemplary embodiment, Wi-Fi communication is used as the first wireless communication and BLE communication is used as the second wireless communication, this configuration does not limit the invention. Wireless communication other than Wi-Fi communication may be used as a first wireless communication and wireless communication other than BLE communication may be used as a second wireless communication.

The various numerical values shown in conjunction with the foregoing exemplary embodiment are all illustrative, and it is a matter of course that numerical values other than the aforementioned numerical values can also be used.

The foregoing exemplary embodiment is mere illustrative in all respects. The foregoing descriptions of the exemplary embodiment do not restrict the interpretation of the invention. The invention can be carried out in various forms without departing from the gist and main features of the invention.

The entire disclosure of Japanese Patent Application No. 2016-141061, filed Jul. 19, 2016 is expressly incorporated by reference herein.

An aspect of the invention provides a wireless communication apparatus that operates on electric power supplied from a battery. The wireless communication apparatus includes a first wireless communication unit that performs a first wireless communication, a second wireless communication unit that performs a second wireless communication that consumes less electric power than the first wireless communication, a battery's state detection unit that detects a state of the battery, and a first control unit that controls the first wireless communication unit and the second wireless communication unit. The first control unit determines which one of the first wireless communication and the second wireless communication to adopt as a wireless communication that is to be used for communication, based on the state of the battery detected by the battery's state detection unit.

According to this aspect of the invention, a wireless communication apparatus that operates on electric power supplied from a battery and that is capable of determining an optimal handover destination based on the state of the battery can be provided.

This is because the first control unit determines which one of the first wireless communication and the second wireless communication to adopt as the wireless communication that is to be used for communication on the basis of the state of the battery detected by the battery's state detection unit.

In the wireless communication apparatus according to the foregoing aspect of the invention, when the battery's state detection unit has detected as a state of the battery that the wireless communication apparatus is not being battery powered, the first control unit may determine adoption of the first wireless communication as the wireless communication to be used for communication, and when the battery's state detection unit has detected as a state of the battery that the wireless communication apparatus is being battery powered, the first control unit may determine adoption of the second wireless communication as the wireless communication to be used for communication.

According to this embodiment of the invention, a wireless communication apparatus that operates on electric power supplied from a battery and that is capable of determining an optimal handover destination based on the state of the battery can be provided.

Furthermore, in the wireless communication apparatus of the invention, when the battery's state detection unit has detected as a state of the battery that remaining amount of electric power accumulated in the battery is greater than or equal to a predetermined threshold value, the first control unit may determine adoption of the first wireless communication as the wireless communication to be used for communication, and when the battery's state detection unit has detected as a state of the battery that the remaining amount of electric power accumulated in the battery is less than the predetermined threshold value, the first control unit may determine adoption of the second wireless communication as the wireless communication to be used for communication.

According to this embodiment of the invention, a wireless communication apparatus that operates on electric power supplied from a battery and that is capable of determining an optimal handover destination based on the state of the battery can be provided.

Further, in the foregoing wireless communication apparatus of the invention, the second wireless communication unit may send connection information for connecting to an access point by the first wireless communication, to a partner wireless communication terminal by the second wireless communication.

Still further, in the wireless communication apparatus of the invention, after a partner wireless communication terminal sends print data by the first wireless communication or after printing based on the print data is completed, supply of electric power to the first wireless communication unit may be stopped and supply of electric power to the second wireless communication unit may be started.

According to this embodiment, stopping the supply of electric power to the first wireless communication unit realizes electric power saving.

Further, in the foregoing wireless communication apparatus of the invention, when the battery's state detection unit has detected as a state of the battery that the wireless communication apparatus is not being battery powered, the supply of electric power to the first wireless communication unit may be stopped and the supply of electric power to the second wireless communication may be started following elapse of a predetermined time after the partner wireless communication terminal sends print data by the first wireless communication or after printing based on the print data is completed, and when the battery's state detection unit has detected as a state of the battery that the wireless communication apparatus is being battery powered, the supply of electric power to the first wireless communication unit may be stopped and the supply of electric power to the second wireless communication unit may be started prior to the elapse of the predetermined time after the partner wireless communication terminal sends print data by the first wireless communication or after printing based on the print data is completed.

According to this embodiment, when it is detected that the wireless communication apparatus is not being battery powered, the next print data that is sent from the partner wireless communication terminal prior to the elapse of the predetermined time can be expeditiously received by the first wireless communication unit. The expeditious reception is realized because when it is detected that the wireless communication apparatus is not being battery powered, the handover from the first wireless communication to the second wireless communication is not performed before the predetermined time elapses.

Further, in the wireless communication apparatus of the invention, when the battery's state detection unit has detected as a state of the battery that the wireless communication apparatus is not being battery powered, the second wireless communication unit may notify a partner wireless communication terminal of a wireless connection that uses an external access point, and when the battery's state detection unit has detected as a state of the battery that the wireless communication apparatus is being battery powered, the second wireless communication unit may notify the partner wireless communication terminal of a wireless connection that uses an internal access point.

According to this embodiment, when it is detected that the wireless communication apparatus is being battery powered, the first wireless communication can be performed via the internal access point. This achieves the following advantages.

That is, when it is detected that the wireless communication apparatus is being battery powered, there is possibility that the user may be using the wireless communication apparatus at a location away from home and connection setting may not be made for an external access point at that location away from home. Therefore, when it is detected that the wireless communication apparatus is being battery powered, a wireless connection by an internal access point, instead of a wireless connection by an external access point, is notified. This causes the partner wireless communication terminal to automatically establish a wireless connection by an internal access point, achieving an advantage of improved ease of handling.

Further, in the wireless communication apparatus of the invention, the second wireless communication may be communication by Bluetooth Low Energy.

Another aspect of the invention provides a wireless communication terminal that communicates with a wireless communication apparatus. The wireless communication terminal includes a third wireless communication unit that performs a first wireless communication, a fourth wireless communication unit that performs a second wireless communication that consumes less electric power than the first wireless communication, a battery's state acquisition unit that acquires a state of a battery of the wireless communication apparatus, and a second control unit that controls the third wireless communication unit and the fourth wireless communication unit. The second control unit determines which one of the first wireless communication and the second wireless communication to adopt as a wireless communication that is to be used for communication based on the state of the battery of the wireless communication apparatus acquired by the battery's state acquisition unit.

According to this second aspect of the invention, a wireless communication terminal that communicates with the wireless communication apparatus according to the first aspect of the invention and that is capable of determining an optimal handover destination based on the state of the battery of the partner wireless communication apparatus.

This is because the second control unit determines which one of the first wireless communication and the second wireless communication to adopt as the wireless communication that is to be used for communication on the basis of the state of the battery detected by the battery's state detection unit.

Still another aspect of the invention provides a computer-readable and non-transitory recording medium storing a program for causing a wireless communication terminal that communicates with a wireless communication apparatus and that includes a third wireless communication unit that performs a first wireless communication, a fourth wireless communication unit that performs a second wireless communication that consumes less electric power than the first wireless communication, a second control unit that controls the third wireless communication unit and the fourth wireless communication unit to function as a battery's state acquisition unit that acquires a state of a battery of the wireless communication apparatus, and a wireless communication determination unit that selects one of the first wireless communication and the second wireless communication as a wireless communication to be used for communication, based on the state of the battery of the wireless communication apparatus acquired by the battery's state acquisition unit.

According to this aspect of the invention, a program capable of causing a wireless communication terminal that communicates with the wireless communication apparatus according to the foregoing aspect of the invention to determine an optimal handover destination based on the state of the battery of a partner wireless communication apparatus can be provided.

What is claimed is:

1. A wireless communication apparatus comprising:
   a first wireless communication module that performs a first wireless communication;
   a second wireless communication module that performs a second wireless communication that consumes less electric power than the first wireless communication;
   a power supply circuit that supplies electric power to the first wireless communication module and the second wireless communication module by receiving electric power supply from a battery or an external power supply; and
   a processor that detects whether the power supply circuit is in a first state for receiving the electric power supply from the external power supply or in a second state for receiving the electric power supply from the battery,
   the processor controlling the first wireless communication module and the second wireless communication module, and
   the processor determining which one of the first wireless communication and the second wireless communication to adopt as a wireless communication that is to be used for communication, based on detection result by the processor.

2. The wireless communication apparatus according to claim 1, wherein when the processor has detected that the power supply circuit is in the first state, the processor determines adoption of the first wireless communication as the wireless communication to be used for communication, and when the processor has detected that the power supply circuit is in the second state, the processor determines adoption of the second wireless communication as the wireless communication to be used for communication.

3. The wireless communication apparatus according to claim 1, wherein when the processor has detected that remaining amount of electric power accumulated in the battery is greater than or equal to a predetermined threshold value, the processor determines adoption of the first wireless communication as the wireless communication to be used for communication, and when the processor has detected that the remaining amount of electric power accumulated in the battery is less than the predetermined threshold value, the processor determines adoption of the second wireless communication as the wireless communication to be used for communication.

4. The wireless communication apparatus according to claim 1, wherein the second wireless communication module sends connection information for connecting to an access point by the first wireless communication, to a partner wireless communication terminal by the second wireless communication.

5. The wireless communication apparatus according to claim 1, wherein after a partner wireless communication terminal sends print data by the first wireless communication or after printing based on the print data is completed, supply of electric power to the first wireless communication module is stopped and supply of electric power to the second wireless communication module is started.

6. The wireless communication apparatus according to claim 5, wherein when the processor has detected that the power supply circuit is in the first state, the supply of electric power to the first wireless communication module is stopped and the supply of electric power to the second wireless communication is started following elapse of a predetermined time after the partner wireless communication terminal sends print data by the first wireless communication or after printing based on the print data is completed, and when the processor has detected that the power supply circuit is in the second state, the supply of electric power to the first wireless communication module is stopped and the supply of electric power to the second wireless communication module is started prior to the elapse of the predetermined time after the partner wireless communication terminal sends print data by the first wireless communication or after printing based on the print data is completed.

7. The wireless communication apparatus according to claim 1, wherein when the processor has detected that the power supply circuit is in the first state, the second wireless communication module notifies a partner wireless communication terminal of a wireless connection that uses an external access point, and when the processor has detected that the power supply circuit is in the second state, the second wireless communication module notifies the partner wireless communication terminal of a wireless connection that uses an internal access point.

8. The wireless communication apparatus according to claim 1, wherein the second wireless communication is communication by Bluetooth Low Energy.

9. The wireless communication apparatus according to claim 1, wherein the wireless communication apparatus includes a printer, a scanner or a facsimile machine.

10. A wireless communication method for a wireless communication apparatus that includes a first wireless communication module that performs a first wireless communication, a second wireless communication module that performs a second wireless communication that consumes less electric power than the first wireless communication, a processor that controls the first wireless communication module and the second wireless communication module, and a power supply circuit that supplies electric power to the first wireless communication module and the second wireless communication module by receiving electric power supply from a battery or an external power supply, the wireless communication method comprising:
    detecting, by the processor, whether the power supply circuit is in a first state for receiving the electric power supply from the external power supply or in a second state for receiving the electric power supply from the battery; and
    determining, by the processor, which one of the first wireless communication and the second wireless communication to adopt as a wireless communication that is to be used for communication, based on detection result by the detecting.

11. A wireless communication terminal that communicates with a wireless communication apparatus, the wireless communication terminal comprising:
    a third wireless communication module that performs a first wireless communication;
    a fourth wireless communication module that performs a second wireless communication that consumes less electric power than the first wireless communication; and
    a processor that acquires information indicating whether a power supply circuit of the wireless communication apparatus is in a first state for receiving electronic power supply from an external power supply or in a second state for receiving the electronic power supply from a battery,
    the processor controlling the third wireless communication module and the fourth wireless communication module, and
    the processor determining which one of the first wireless communication and the second wireless communication to adopt as a wireless communication that is to be used for communication based on the information acquired by the processor.

12. A computer-readable and non-transitory recording medium storing a program for causing a wireless communication terminal that communicates with a wireless communication apparatus and that includes a third wireless communication module that performs a first wireless communication, a fourth wireless communication module that performs a second wireless communication that consumes less electric power than the first wireless communication, a processor that controls the third wireless communication module and the fourth wireless communication module to function as:
    acquiring, by the processor, information indicating whether a power supply circuit of the wireless communication apparatus is in a first state for receiving electronic power supply from an external power supply or in a second state for receiving the electronic power supply from a battery; and
    selecting, by the processor, one of the first wireless communication and the second wireless communication as a wireless communication to be used for communication, based on the information acquired by the processor.

\* \* \* \* \*